United States Patent [19]
Johnston

[11] 4,257,068
[45] Mar. 17, 1981

[54] SYSTEM FOR PERIODICALLY REVERSING THE ORDER OF VIDEO DATA IN A FLAT PANEL DISPLAY DEVICE

[75] Inventor: Loren B. Johnston, Princeton, N.J.

[73] Assignee: RCA Corporation, New York, N.Y.

[21] Appl. No.: 98,697

[22] Filed: Nov. 29, 1979

[51] Int. Cl.³ .................. H04N 3/00; H04N 5/68
[52] U.S. Cl. ............................. 358/242; 313/422; 340/768; 340/800
[58] Field of Search ............... 358/242; 313/422; 340/768, 800

[56] References Cited
U.S. PATENT DOCUMENTS

| | | | |
|---|---|---|---|
| 4,080,630 | 3/1978 | Marlowe | 358/242 |
| 4,117,368 | 9/1978 | Marlowe et al. | 313/422 |

*Primary Examiner*—Robert L. Richardson
*Attorney, Agent, or Firm*—E. M. Whitacre; G. H. Bruestle; L. L. Hallacher

[57] ABSTRACT

The analog video signal for a modular flat panel display device is digitized in an analog to digital converter. The digitized data are supplied to a left/right serial shift register. A left/right control signal causes the left/right shift register to periodically receive data on either a left input terminal during a left loading mode or a right input terminal during a right loading mode. In each loading mode a portion of the data are output from the serial register over a right output terminal and the other portion over a left output terminal. Accordingly, during each loading mode one portion of the data is output in the same order as received and the other portion in an order reversed from the received order. The data from the left/right register are supplied to primary registers and because of the operation of the left/right register data for adjacent primary registers are in opposite order.

11 Claims, 4 Drawing Figures

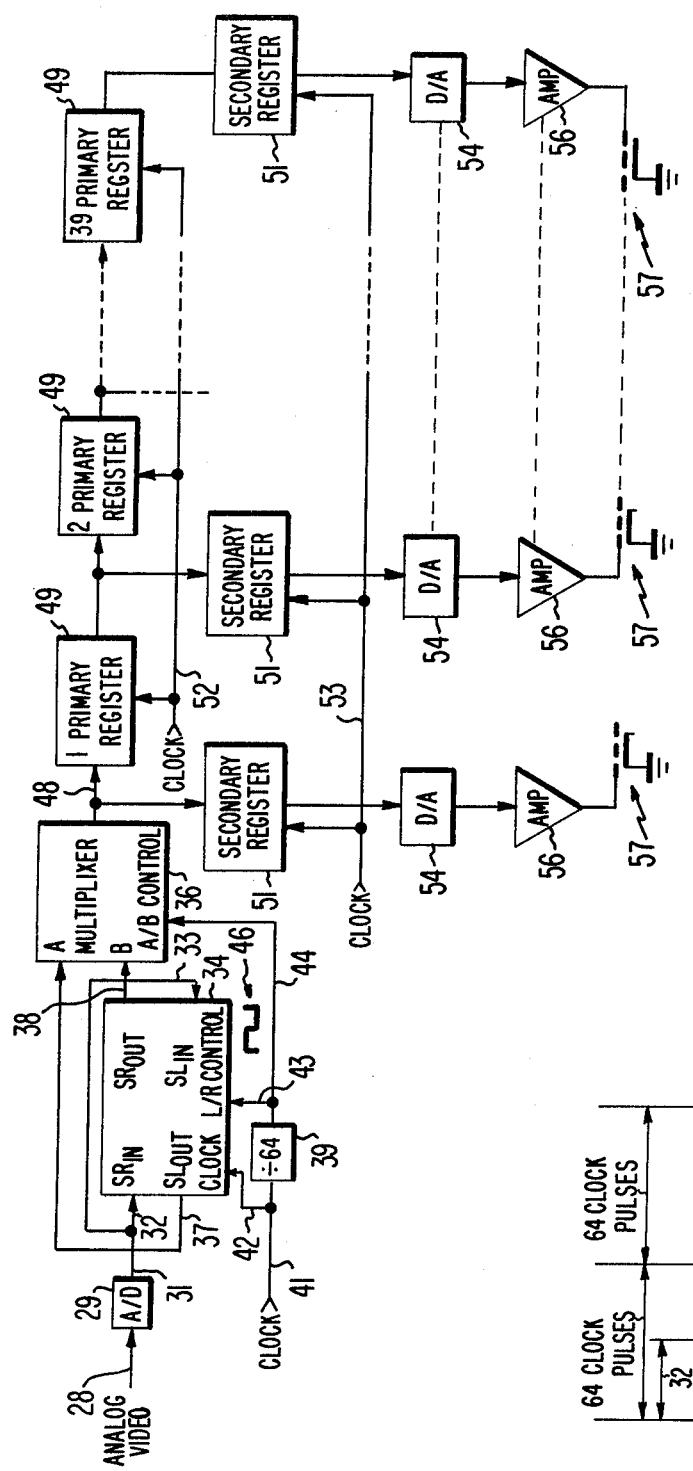

| CLOCK PULSES | DATA IN TERMINAL | DATA OUT TERMINAL | L/R REF. LOADED DATA | VIDEO DATA ORDER IN PRIMARY REGISTERS REGISTER # | | | | | | | | | | | | | | |
|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | --- | 38 | 39 |
| 16 | SR$_{IN}$ | SR$_{OUT}$ | L→R | ↑ | | | | | | | | | | | | | | |
| 32 | SR$_{IN}$ | SL$_{OUT}$ | L→R | ↕ | ↑ | | | | | | | | | | | | | |
| 48 | SL$_{IN}$ | SL$_{OUT}$ | R→L | ↕ | ↓ | ↑ | | | | | | | | | | | | |
| 64 | SL$_{IN}$ | SR$_{OUT}$ | R→L | ↕ | ↓ | ↕ | ↑ | | | | | | | | | | | |
| 80 | SR$_{IN}$ | SR$_{OUT}$ | L→R | ↕ | ↓ | ↕ | ↓ | ↑ | | | | | | | | | |
| 96 | SR$_{IN}$ | SL$_{OUT}$ | L→R | ↕ | ↓ | ↕ | ↓ | ↕ | ↑ | | | | | | | | |
| 112 | SL$_{IN}$ | SL$_{OUT}$ | R→L | ↕ | ↓ | ↕ | ↓ | ↕ | ↓ | ↑ | | | | | | | |
| 128 | SL$_{IN}$ | SR$_{OUT}$ | R→L | ↕ | ↓ | ↕ | ↓ | ↕ | ↓ | ↕ | ↑ | | | | | | |
| 144 | SR$_{IN}$ | SR$_{OUT}$ | L→R | ↕ | ↓ | ↕ | ↓ | ↕ | ↓ | ↕ | ↓ | ↑ | | | | | |
| 160 | SR$_{IN}$ | SL$_{OUT}$ | L→R | ↕ | ↓ | ↕ | ↓ | ↕ | ↓ | ↕ | ↓ | ↕ | ↑ | | | | |
| 176 | SL$_{IN}$ | SL$_{OUT}$ | R→L | ↕ | ↓ | ↕ | ↓ | ↕ | ↓ | ↕ | ↓ | ↕ | ↓ | ↑ | | | |
| 192 | SL$_{IN}$ | SR$_{OUT}$ | R→L | ↕ | ↓ | ↕ | ↓ | ↕ | ↓ | ↕ | ↓ | ↕ | ↓ | ↕ | ↑ | | |
| --- | --- | --- | --- | --- | --- | --- | --- | --- | --- | --- | --- | --- | --- | --- | --- | --- | --- | --- |
| 624 | SL$_{IN}$ | SL$_{OUT}$ | R→L | ↕ | ↓ | ↕ | ↓ | ↕ | ↓ | ↕ | ↓ | ↕ | ↓ | ↕ | ↓ | ↕ | ↑ | |
| 640 | SL$_{IN}$ | SR$_{OUT}$ | R→L | ↕ | ↓ | ↕ | ↓ | ↕ | ↓ | ↕ | ↓ | ↕ | ↓ | ↕ | ↓ | ↕ | ↓ | ↑ |

Fig. 3

SYSTEM FOR PERIODICALLY REVERSING THE ORDER OF VIDEO DATA IN A FLAT PANEL DISPLAY DEVICE

BACKGROUND OF THE INVENTION

This invention relates generally to modular flat panel display devices and particularly to a system for periodically reversing the order of video data in such systems.

A modular flat panel display device in which the instant invention can be utilized is described in U.S. Pat. No. 4,117,368 issued to F. J. Marlowe, et al. The Marlowe device consists of an evacuated envelope which is divided into channels by a plurality of insulating vanes. Each of the channels includes guide meshes for propagating electron beams along the lengths of the channels. When a particular line of the visual display is to be produced, the electron beams are ejected from the guide meshes and travel toward the display screen. The vanes support deflection electrodes which are biased with varying deflection potentials. These deflection potentials cause the electrons travelling from the guide meshes to the display screen to be scanned transversely across the channels. The electron beams of all the channels are simultaneously ejected from between the guide meshes so that a portion of the same horizontal line of the visual display is simultaneously generated across each of the channels. In order to avoid charging the capacitor formed by the deflection electrodes on opposite sides of a vane the same deflection voltage is applied to both deflection electrodes. Adjacent channels, therefore, are scanned in opposite directions. Video information, therefore, must also be supplied to adjacent channels in reverse order.

A system which reverses the order of data supplied to adjacent channels of a modular display device is described in U.S. Pat. No. 4,080,630 issued to F. J. Marlowe. In the Marlowe system, the incoming video data are in analog form and are digitized in an analog to digital converter. The digitized output of the A/D converter is supplied to a reversing shift register which is composed of two stages. The first stage includes a first shift register for each output bit of the digitized video signal. The second stage includes a second shift register for each output bit of the digitized video signal. The first and second shift registers are coupled through switching means to a primary shift register so that either the first or second shift register can load the primary shift register. When the switching means is coupled to the first register, the data are read out serially and directly provided to the primary register. When the switching means is coupled to the second shift register, the data are loaded from the first shift register to the second shift register in parallel form. The second shift register then provides the data to the primary register in an order reversed from the received order. Accordingly, a portion of the digitized data is loaded into the primary register in the same order as received and the other portion is loaded in the reverse order. The Marlowe system, therefore, is rather complex in that the data reversal required the utilization of two shift registers. Additionally, the use of the two shift registers requires precise clocking every 16 pulses in order to alternately load both registers.

SUMMARY OF THE INVENTION

A system for receiving a train of electrical signals and for reversing the order of alternate segments of said train includes an analog to digital converter for converting the incoming analog video data into digital data. The digitized video data are supplied to a plurality of primary shift registers through a left/right shift register which is alternately loaded from left to right and from right to left. A portion of the digitized video data is supplied to the primary shift registers in the same order as received from the A/D converter while the other portion is supplied in an order reversed from the received order. The primary shift registers load the data into secondary shift registers which are simultaneously unloaded so that each channel produces a portion of one line of the video display.

BRIEF DESCRIPTION OF THE DRAWINGS

FIG. 2 is a schematic view of a preferred embodiment of the invention.

FIG. 2a shows the output form of the divide sixty-four counter of FIG. 2.

FIG. 3 is a diagram showing the order of loading of data into the primary storage registers.

DETAILED DESCRIPTION OF THE PREFERRED EMBODIMENT

Figure 1:
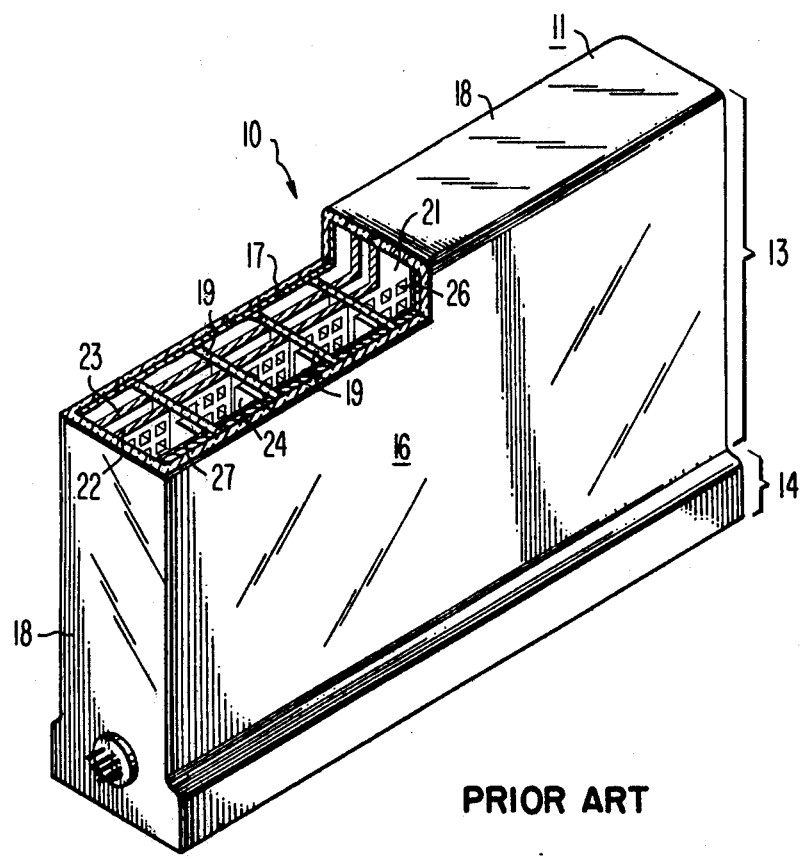
FIG. 1 is a partial cutaway section of a prior art modular display device in which the invention can be employed.

FIG. 1 shows one form of a flat panel display device in which the present invention can be utilized. The display device is generally designated as 10 and includes an evacuated envelope 11 having a display section 13 and an electron gun section 14. The envelope 11 includes a rectangular frontwall 16 and a rectangular backwall 17 in spaced parallel relationship with the frontwall 16. The frontwall 16 and the backwall 17 are connected by four sidewalls 18.

A plurality of spaced parallel, electrically insulating, support vanes 19 are secured between the frontwall 16 and the backwall 17 and extend from the gun section 14 to the opposite sidewall 18. The support vanes 19 provide the desired internal support against external atmospheric pressure and divide the envelope 11 into a plurality of channels 21. Each of the channels 21 encloses a beam guide assembly for propagating electron beams along the lengths of the channels. The beam guide assemblies include a pair of spaced parallel beam guide meshes 22 and 23 extending transversely across the channels 21 and longitudinally along the channels from the gun section 14 to the opposite sidewall 18. The guide meshes 22 and 23 contain a plurality of apertures 26 which are arranged in columns longitudinally of the channels and in rows transversely of the channels. The columns of apertures serve as beam guides for propagating electron beams the length of the channels. Electrons are selectively ejected through the transverse rows of apertures to form one line of the visual display produced on the display screen 27. Deflection electrodes 24 are arranged on both sides of the vanes 19. Deflection potentials are applied to the deflection electrodes of each channel so that electrons travelling from the guide mesh 22 to the display screen 27 are transversely scanned across the channels to produce one line of the visual display.

In the preferred embodiment, shown in FIG. 2, the analog video signal is received on an input lead 28 and provided to an analog to digital converter 29. The A/D converter 29 converts the analog signal into a six bit digital word. If desired, words having a larger number of bits may be used to provide finer gradation of the digitized signal. One bit of the digitized output of the A/D converter is available on an output line 31 which is coupled to two input leads, 32 and 33, of a 16 stage left/right serial shift register 34. The left/right register 34 has a SRin input terminal and a SLin input terminal which are respectively coupled to the output lead 31 of the A/D converter by way of input leads 32 and 33. The left/right shift register 34 also has a SLout and a SRout output terminal. These two output terminals are respectively coupled to A and B input terminal of a multiplexer 36 over output lines 37 and 38.

A symmetrical divider 39 receives clock pulses over input line 41. The clock pulses also are applied to a clock input of the left/right register 34 over line 42. The divided output of divider 39 is coupled to a left/right control terminal of the register 34 by a line 43. The output of the divider 39 is also coupled to the multiplexer 36 by a line 44.

The divider 39 is a symmetrical divider and divides the clock pulses by sixty-four. Accordingly, an output signal 46 is produced which has the form shown in FIG. 2a, where the signal 46 is shown to be repetitive every sixty-four clock pulses. Because the divider 39 is a symmetrical divider the signal 46 is high for a period of 32 pulses and low for the other 32 clock pulses. The changes of the voltage level following the transitions 47 between the high and low states cause the shift register 34 to switch between the SRin and SLin input terminals. Accordingly, for 32 clock pulses data are received from A/D converter 29 through the SRin input and for the next 32 clock pulses the data are received through the SLin input. The voltage level changes following the high-low transitions of the signal 46 also cause the multiplexer 36 to switch between the A and B input terminals. The operation of the left/right shift register 34 is explained more fully hereinafter with reference to FIG. 3.

An output lead 48 of the multiplexer 36 is coupled to a series of primary shift registers 49. The primary shift registers 49 are serially loaded by the left/right register 34 irrespective of whether the data are received by the multiplexer on the A or B input terminal. Accordingly, the multiplexer 36 operates very similar to an ORgate but switching between the input terminals A and B is effected by the output signal of the divider 39. There is one primary register for every module of the display device. Accordingly, a display device having N modules will have N primary registers. However, because of the nature of the left/right register 34, this register preferably is used as one of the primary registers. The number of primary registers 49, therefore, is N−1.

The primary registers 49 are serially loaded and the left/right serial register 34 periodically reverses the order of data, as explained hereinafter. Accordingly, alternate primary registers 39 are loaded with data in opposite order.

A plurality of secondary registers 51 is available for loading by the primary registers 49. When all of the primary registers 49 are serially loaded, the clock pulses provided on the line 52 cause the stored data to be transferred to the secondary registers 51. There is one secondary register for each channel of the display device and every register then contains the data required for each channel to develop one segment of a line of the visual display. Each seconday register feeds a different digital to analog converter 54 which controls an electron gun 57 through an amplifier 56. When all of the secondary registers 41 are loaded, the clock pulses provided on the line 53 cause the stored data to be transferred to the respective D/A converters 54 and converted to analog signals. The analog signals are amplified by the respective amplifiers 56 and provided to the control grids of the electron guns 57.

As shown in FIG. 1, both sides of the vanes 19 support a deflection electrode 24. One of these electrodes is the right electrode for one of the channels 21 while the other electrode is the left electrode for the adjacent channel. In order to avoid charging the capacitor formed by the deflection plates on each vane adjacent channels are scanned in opposite directions. This can be accomplished by using either a sawtooth or a triangular scanning waveform. Irrespective of the type of scanning waveform used the same potential is applied to both deflection plates on each vane and no capacitor charging occurs. However, this reverse scanning requires that the video data for adjacent channels be received in reverse order. The manner in which the left/right register 34 reverses some of the data can be understood by referring to FIGS. 2 and 3.

The left/right shift register 34 is a universal shift/storage register of a type available in the art. As an example, a Texas Instrument S/N 74LS299 register can be used. The register 34 has two input terminals, SRin and SLin. Switching between these input terminals occurs every 32 clock pulses because of the divider 39. Accordingly, for the first 32 clock pulses digital video data are received by the register 34 over the SRin terminal and for the second 32 clock pulse digital video data are received over the SLin terminal.

The manner in which the left/right register 34 reverses the video data is explained with reference to FIG. 3 which shows the loading status of the primary registers 49 for each set of 16 clock pulses. In FIG. 3 the primary register numbered #1 is the first primary register to receive data from the left/right register 34. The small arrows are used to indicate the direction of the stored data. Thus, an arrow pointing to the right indicates data which are output from register 34 in the same order as received, while an arrow printing to the left indicates reversed data; that is, data output from the register 34 in the order reversed from the received order. FIG. 3 also shows the input and output terminals which are activated by each 16 pulse segment of the clocking pulse train. The output terminals shown in FIG. 3 are those over which data leave the register 34 irrespective of which input terminal the data were received over.

The first 16 pulses of the video signal are received by register 34 on the SRin input terminal and are stored in the register 34 in the order received. As shown in FIG. 3, the primary register 49, which is labeled #1 in FIG. 2, has not received data during the first 16 clock pulses. The second 16 clock pulses (the 32 clock pulse line in FIG. 3) of video information also are received on the SRin input terminal. During the second 16 pulses the video information received during the first 16 pulses is transferred to the first primary register 49 from output terminal SRout and thus in the same order as received from the A/D converter 29. As shown in FIG. 3, the primary register 49, which is labled #1 in FIG. 2, now is loaded with video data in the received order. The output signal of the divider 39 changes state after 32 clock pulses. Therefore, the third set of 16 pulses (the 48 pulse line in FIG. 3) is received from the A/D converter 29 over the SLin input terminal. For this reason, the 16 pulses previously stored in the register 34, which were received over the SRin input terminal, are output over the SLout output terminal and thus in the order reversed from that received. The information previously stored in primary register #1 is transferred to primary register #2 and register #2 is loaded with data in reverse order from the left/right register 34. During the fourth set of 16 clock pulses (the 64 pulse line in FIG. 3) video information continues to be received over the SLin input terminal. However, the 16 video pulses stored during the previous 16 clock pulses are output over the SLout output terminal, and thus in the order received.

From the above description and reference to FIG. 3 it should now be understood that for 32 clock pulses video information is received by left/right register 34 over either the SRin or the SLin input terminal. However, the first half of the video information is output from the register 34 over the corresponding output terminal and the second half is output over the other output terminal. Accordingly, the first half of the video data is supplied to the primary registers in the same order as received and the second half in the opposite order as received.

FIG. 3 shows that after 640 clock pulses all of the primary registers are loaded and that adjacent registers are loaded with data in opposite orders. At this time the clock pulses on line 52 cause the stored video data to be transferred to the secondary registers 51. This transfer occurs during the horizontal blanking interval. At the termination of horizontal blanking the reloading of the primary registers 49 begins and the secondary registers 51 transfer the stored data to the D/A converters 54 which convert the digital video data to analog data. The analog outputs of the D/A converters 54 are amplified in amplifiers 56 and used to control the electron guns 57 of each channel.

What is claimed is:

1. A system for receiving a train of electrical signals and for reversing the order of alternate segments of said train comprising:
   analog to digital converter means for receiving said signals in analog form and converting said signals into digital data;
   reversing shift register means for receiving said digital data, said reversing shift register means having a right and a left input terminal and a right and a left output terminal;
   means for providing clock pulses to said reversing shift register means;
   means for providing left/right control signals to said reversing shift register means so that said reversing shift register means alternately receives said digital video data over said right and left input terminals for a predetermined number of clock pulses and unloads a portion said digital data over said right output terminal in said received direction and a portion of said digital data over said left output terminal in said reversed direction for each of said predetermined number of clock pulses;
   means responsive to said right and left output terminals for providing said digital data to a plurality of primary register means so that adjacent primary registers are provided with said digital data in said received order and said reversed order;
   a plurality of secondary register means individually responsive to said primary register means;
   a plurality of digital-to-analog converters responsive to said secondary register means for simultaneously providing analog data to each of said channels so that channels scanned in said first direction receive said data in said received order and channels scanned in said second direction receive said data in said reversed order.

2. The system of claim 1 wherein there are N channels in said display device, and wherein there are N of said primary registers and N of said secondary registers.

3. The system of claim 2 wherein said reversing shift register also functions as one of said primary shift registers.

4. The system of claim 1 wherein said means for providing left/right control signals includes a symmetrical divider providing an output signal having a high state and a low state and wherein said reversing shift register switches between said right and left input terminals in response to the transitions of said signal between said states.

5. The system of claim 3 wherein said means for providing left/right control signals includes a symmetrical divider providing an output signal having a high state and a low state and wherein said reversing shift register switches between said right and left input terminals in response to the transitions of said signal between said states.

6. The system of claim 1 further including clock means for activating said primary registers and said secondary registers so that data are transferred from said primary registers to said secondary registers and from said secondary registers to said digital-to-analog converters.

7. The system of claim 3 further including clock means activating said primary registers and said secondary registers so that data are transferred from said primary registers to said secondary registers and from said secondary registers to said digital-to-analog converters.

8. The system of claim 4 wherein said symmetrical divider divides said predetermined number of pulses by 64 so that said reversing shift register switches between said right and left input terminals every 32 clock pulses.

9. The system of claim 5 wherein said symmetrical divider divides said predetermined number of pulses by 64 so that said reversing shift register switches between said right and left input terminals every 32 clock pulses.

10. In a modular flat panel display device having a plurality of vanes dividing said display device into a plurality of channels, both sides of said vanes supporting deflection plates for transversely scanning adjacent channels in opposite first and second directions to produce a line of a visual display on said display device in response to video data, a system for reversing portions of said video data so that adjacent channels receive said data in received and reversed directions corresponding to said first and second directions comprising;
   analog-to-digital converter means for receiving said video data in analog form and converting said video data into digital video data;
   reversing shift register means for receiving said digital video data, said reversing shift register means having a right and a left input terminal and a right and a left output terminal;
   means for providing clock pulses to said reversing shift register means;
   means for providing left/right control signals to said reversing shift register means so that said reversing shift register means alternately receives said digital video data over said right and left input terminals for a predetermined number of clock pulses and unloads a portion said digital video data over said right output terminal in said received direction and a portion of said digital video data over said left output terminal in said reversed direction for each of said predetermined number of clock pulses;

means responsive to said right and left output terminals for providing said digital data to a plurality of primary register means so that adjacent primary registers are provided with said digital video in said received order and said reversed order;

a plurality of secondary register means individually responsive to said primary register means;

a plurality of digital-to-analog converters responsive to said secondary register means for simultaneously providing analog data to each of said channels so that channels scanned in said first direction received said video data in said received order and channels scanned in said second direction receive said video data in said reversed order.

11. The system of claim 10 wherein there are N channels in said display device, and wherein there are N of said primary registers and N of said secondary registers and wherein said reversing shift register also functions as one of said primary registers.

* * * * *

UNITED STATES PATENT AND TRADEMARK OFFICE
CERTIFICATE OF CORRECTION

PATENT NO. : 4,257,068

DATED : March 17, 1981

INVENTOR(S) : Loren B. Johnston

It is certified that error appears in the above-identified patent and that said Letters Patent is hereby corrected as shown below:

Column 3, line 67, the word "seconday", should read --secondary--.

Column 7, line 13, the portion reading "said digital video in said", should read --said digital video data in said--

Signed and Sealed this

Eighteenth Day of August 1981

[SEAL]

Attest:

GERALD J. MOSSINGHOFF

Attesting Officer

Commissioner of Patents and Trademarks